United States Patent

Long et al.

[11] 3,898,491
[45] Aug. 5, 1975

[54] DAMPER WINDING FOR TURBINE GENERATOR ROTORS

[75] Inventors: Lawrence J. Long; William C. Brenner, both of Pittsburgh, Pa.

[73] Assignee: Westinghouse Electric Corporation, Pittsburgh, Pa.

[22] Filed: Oct. 10, 1973

[21] Appl. No.: 405,197

[52] U.S. Cl. ................. 310/183; 310/218; 310/262
[51] Int. Cl.² ...................... H02K 1/22; H02K 1/18
[58] Field of Search .......... 310/182, 183, 262, 269, 310/211, 212, 217, 218, 197, 42, 190, 210

[56] References Cited
UNITED STATES PATENTS
3,447,012  5/1969  Staebler et al. ................... 310/262

FOREIGN PATENTS OR APPLICATIONS
95,215  7/1923  Germany .......................... 310/183
276,228  9/1970  U.S.S.R. ............................ 310/183
1,055,110  4/1959  Germany .......................... 310/183
327,500  5/1917  Germany .......................... 310/183

*Primary Examiner*—Mark O. Budd
*Attorney, Agent, or Firm*—G. H. Telfer

[57] ABSTRACT

A damper winding for the rotors of large turbine generators to shield the rotor surface and windings from non-synchronous fluxes, or to reduce the negative resistance of the generator. The damper winding consists of longitudinal bars of low resistance material placed on the surface of the rotor over each tooth, including teeth formed on the pole face portions. The bars have longitudinal recesses to fit over the teeth and engage in the slot on each side for mechanical support of the bar, and the bars are in electrical contact with each other throughout their length to form a continuous conducting surface.

5 Claims, 4 Drawing Figures

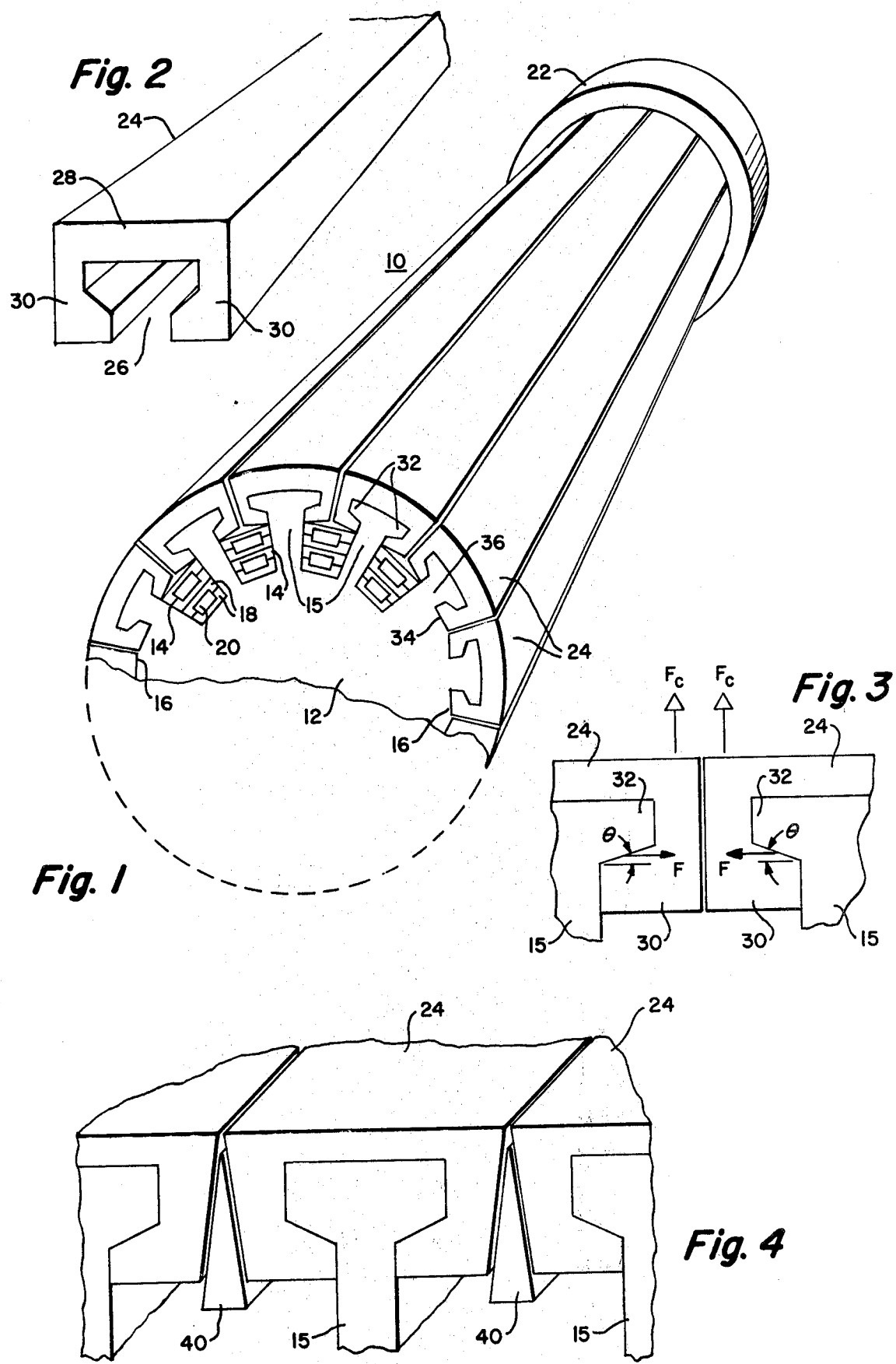

DAMPER WINDING FOR TURBINE GENERATOR ROTORS

BACKGROUND OF THE INVENTION

The present invention relates to damper windings, or a system of damper bars, for the rotors of large turbine generators.

The ratings of turbine generators have been greatly increased in recent years by improvements in the cooling systems which have made it possible to obtain more output per unit volume and thus to increase the capacity of a machine of given size. This increase, however, has been primarily due to improvements in the steady-state cooling means which have little effect on the temperature rise of the machine under emergency or fault conditions. These conditions are usually of short duration and the temperature rise resulting from them is primarily a function of the current and the number of conductors per inch and of the thermal capacity of the machine. Raising the rated capacity of a machine of given size by improved steady-state cooling, therefore, does not necessarily affect its performance under emergency conditions, and it is possible that a machine with entirely satisfactory performance under normal conditions may reach dangerous or damaging temperatures under fault conditions. As the size and ratings of these very large generators continue to increase, this problem becomes more severe.

One particularly serious emergency condition which can cause dangerous overheating of the rotor is a line-to-line or line-to-neutral fault on the line to which the machine is connected, or at the machine terminals. Such a fault results in an unbalanced condition and causes negative sequence currents to flow in the stator of the machine. The associated flux wave causes induced currents of high magnitude and twice line frequency to circulate in the rotor surface and windings and through the retaining rings, the rotor surface acting as the rotor of an induction machine at a slip of 2.0 because of the reversely rotating flux wave. Unbalanced steady-state line currents may also cause overheating of the rotor in the same way. The magnitude of these induced negative sequence currents in the rotor may be quite high and may result in temperatures high enough to damage the rotor. The heating effect of these induced currents is, of course, proportional to the square of the current and the time during which it flows ($I_2^2 t$), and present industry standards require that large generators withstand negative sequence heating equivalent to $I_2^2 t = 10$ without damage. This requirement is difficult to meet with present-day designs in the largest sizes of machines now being built, and still larger machines of conventional design may not be able to meet the requirement of this standard.

Another problem is sometimes encountered in the use of large turbine generators to supply a power system which has series capacitors in its lines. It such a system, subsynchronous oscillations may be excited by switching operations, or other transient phenomena. These oscillations are usually in the range of from 20 to 40 hertz on a 60 hertz system, and can be damped out by the resistance of the system, the rate of damping increasing with the resistance. If there were no resistance in the system, the oscillations would persist indefinitely. The total resistance available in the system for damping these oscillations is the resistance of the transmission line itself plus the resistance of the generator. The subsynchronous oscillating currents flowing in the generator stator winding produce a flux wave in the air gap of the same low frequency. This flux wave, therefore, appears to be rotating in the reverse direction with respect to the rotor, which is rotating at synchronous speed in the forward direction, and induces low frequency currents in the surface and windings of the rotor. In effect, the machine then becomes an induction generator at a negative slip, drawing reactive magnetizing power from the system. The resistance of the generator therefore appears to the system as a negative resistance, and the total resistance available for damping the subsynchronous oscillations is correspondingly reduced. This tends to cause the oscillations to persist, and if the negative resistance of the generator is high enough, it may even cause the oscillations to increase in magnitude which, of course, is not permissible. This condition can be improved by reducing the resistance of the generator rotor so that the apparent generator negative resistance is decreased and the damping effect is increased.

Both of the problems discussed above are affected by the damper winding usually provided on the rotors of large generators, since such windings tend to shield the rotor to some extent from negative sequence currents and also tend to reduce the effective rotor resistance by providing low resistance current paths. The damper windings used heretofore, however, have not been very effective for either of these purposes because they were disposed within the rotor slots and did not effectively shield the surface.

An improved rotor damper winding which is highly effective in shielding the rotor is disclosed and claimed in a copending application of L. J. Long and S. J. Salon, Ser. No. 383,424, filed July 27, 1973, and assigned to the Assignee of the present invention. The damper winding of this prior application consists of a plurality of longitudinal damper bars of low resistance placed in the slots of the rotor, and preferably also in shallow slots in the pole faces. These bars extend radially above the rotor surface and extend laterally or circumferentially on each side of the slot so as to overlie at least part of the rotor surface. The bars are connected together at the ends to form a squirrel-cage type of winding and this is preferably done by a low resistance ring at each end supported within the retaining ring. This type of damper winding can be designed to be quite effective in shielding the rotor from negative sequence currents and in reducing the apparent negative resistance but it presents some difficult mechanical problems. The most effective design of the damper bars requires them to have a considerable lateral extent on each side of the slot so that they have relatively large unsupported sections which must be capable of withstanding the high centrifugal forces to which they are subjected during rotation of the rotor. The end rings connecting the damper bars also present a problem since they must be supported in the retaining rings which are already highly stressed so that it is undesirable to impose this additional load on them. The damper winding disclosed in the prior application therefore provides greatly improved electrical performance over prior rotor designs, but it results in a mechanical structure which introduces difficult design problems.

SUMMARY OF THE INVENTION

In accordance with the present invention, an improved damper winding is provided for the rotors of large turbine generators which not only gives more effective shielding of the rotor surface but results in a relatively simple mechanical construction in which there are no unsupported sections of the winding and no end rings are required for electrical connection.

The new damper winding consists of a plurality of longitudinal bars of low resistance material placed on the surface of the rotor. Each bar has a longitudinal recess extending for its entire length so that the bar has radial sections on each side and fits closely over a rotor tooth. A damper bar is provided for each tooth of the rotor, teeth preferably also being formed in the pole face portions by shallow slots, and the damper bars are thus placed over the entire surface of the rotor. The radial sections of the bars engage in the rotor slots and adjacent bars are in electrical contact with each other throughout their length. Thus, a well supported mechanical structure is provided which requires no end rings for electrical connection, and a substantially continuous low resistance conducting surface extends over the entire rotor surface which effectively shields the rotor from non-synchronous fluxes and also results in a low resistance rotor.

BRIEF DESCRIPTION OF THE DRAWINGS

The invention will be more fully understood from the following detailed description, taken in connection with the accompanying drawings, in which:

FIG. 1 is a perspective view of one end of a rotor showing a preferred embodiment of the invention;

FIG. 2 is a perspective view of one end of a single damper bar;

FIG. 3 is a diagram illustrating the forces on the damper bars; and

FIG. 4 is a fragmentary transverse perspective view showing a modified embodiment of the invention.

DESCRIPTION OF THE PREFERRED EMBODIMENTS

The invention is shown in FIG. 1 embodied in a turbine generator rotor 10 of typical construction. The rotor 10 has a generally cylindrical body 12 made of the usual alloy steel and provided with longitudinal slots 14 which form teeth 15 between them. The slots 14 are arranged in the usual manner in groups separated by pole face portions 16. Winding conductors 18 are disposed in the slots 14 and connected to form concentric coils for producing magnetic poles in the pole face portions 16. The conductors 18 may be of any usual or desired construction and any desired electrical circuit may be utilized for the rotor winding. As shown, the conductors 18 are provided with longitudinal ducts 20 for circulation of a coolant gas such as hydrogen. The conductors 18 extend beyond the ends of the rotor body 12 and extend circumferentially in the end regions to complete the electrical coil circuits. Heavy steel retaining rings 22 of the usual type are provided at each end of the rotor 10 to support the end turns of the rotor winding and may be secured to the rotor body 12 in any suitable usual manner.

In accordance with the present invention, an improved damper winding is provided consisting of a plurality of longitudinal damper bars 24. As shown in FIG. 2, each of the bars 24 is a longitudinal bar of generally rectangular cross-section with a longitudinal recess 26 extending the entire length of the bar. The bar thus has a central body portion 28 and radial portions 30 extending down from the central portion 28 at each side. The radial portions 30 are formed as shown to conform to the configuration of the teeth 15.

As shown in FIG. 1, a bar 24 is placed on each of the teeth 15, the radial sections 30 of the bar engaging under the shoulders 32 at each side of the tooth. Each bar extends over the full length of a tooth and engages in the slot 14 on each side so that the bar is fully supported against radial forces. The width of the bars is made such that the radial section 30 of each bar occupies approximately half the width of a slot, so that the two bars in each slot together constitute a wedge for supporting the conductors 18 in the slot. Since it is desirable to extend the damper winding completely around the rotor, shallow slots 34 are cut in the pole face portions 16 form teeth 36 of the same configuration as the top of the teeth 15. Damper bars 24 are fitted on the teeth 36 so that a continuous series of damper bars extends completely around the circumference of the rotor with a damper bar placed on each of the teeth 15 and 36.

As indicated, the width of the damper bars 24 is made such that the radial sections 30 of each two adjacent bars fill the top of a slot 14 and function as a wedge to support the windings 18. Adjacent damper bars 24 are thus in contact with each other throughout their entire length, and they are designed so that they are in sufficiently good engagement for satisfactory electrical contact. The damper bars are thus in electrical connection throughout their entire lengths and no separate end connections or end rings are required. As shown in FIG. 3, the construction is inherently such that the bars 24 are forced together. Each of the shoulders 32 has an angle $\theta$ on its lower surface. When the rotor 10 is being driven at high speed in normal operation, high centrifugal forces $F_c$ occur tending to force the bars 24 in the radially outward direction. The bars are thus urged against the lower surfaces of the shoulders 32 and, because of their inclination, a resultant force $F$ equal to $F_c \tan \theta$ is applied to each of the bars as indicated, tending to force the bars together. The construction, therefore, is such that in normal operation the bars are urged into good electrical contact throughout their length.

The damper bars 24 may be made of any suitable material having low electrical resistance and sufficient mechanical strength. Aluminum alloys are very suitable for this purpose, although other materials having the neccessary properties, such as beryllium copper alloys, may be utilized.

The bars 24 are readily driven into place over the teeth 15 and 36 in the manufacture of the rotor, and after installation they may be tightened in place by any suitable means such as by a flexible tube placed in the bottom of each slot and pressurized with a suitable resin. The radial sections 30 of the bars should be made of sufficient size to have the necessary mechanical strength, and the central portions 28 of the bars should be made of sufficient radial thickness for adequate mechanical strength and to be at least equal to the depth of penetration of induced negative sequence currents. Since the very large machines for which the invention is particularly intended have relatively large air gaps between rotor and stator, the thickness of the damper bars above the rotor surface is not sufficient to interfere with the normal design of the machine. The rotor windings 18 may be cooled in any desired or usual manner, as by use of the longitudinal coolant ducts 20 mentioned above, and the bars 24 may be drilled radially in any desired locations for circulation of coolant gas, so that the rotor may be cooled in any usual or known manner such as that shown for example in Baudry U.S. Pat. No. 3,110,827.

A somewhat modified construction of the damper winding is shown in FIG. 4 which avoids reliance on the tooth construction to force the bars into contact. As shown in FIG. 4, the teeth 15 and bars 24 are made as previously described, but a wedge 40 is placed between each adjacent pair of bars. The wedge 40 may be a thin, tapered copper bar extending the length of the rotor slot and is driven in place between the bars as shown. In operation, the centrifugal force pushes the tapered bar 40 radially outward between the adjacent damper bars and thus forces them tightly against the teeth while insuring an excellent electrical contact between adjacent bars through the copper wedge.

It will be seen that the effect of the damper construction described is to provide, in effect, a continuous conducting surface over the entire rotor above the normal rotor surface. The rotor surface itself is thus very effectively shielded from non-synchronous fluxes, so that negative sequence current heating of the rotor surface is prevented and any such heating that may occur in the damper winding is minimized because of the very low resistance. Similarly, the effective rotor resistance is greatly reduced for the same reason. It is also to be noted that since the bars 24 are in electrical contact throughout their length, no connecting means is needed at the ends and the necessity for connecting end rings, with their attendant mechanical problems, as previously proposed, is eliminated. The new damper winding, therefore, provides a very desirable mechanical construction since there are no unsupported sections of the damper bars and no end connections, while at the same time improved electrical performance is obtained because of the substantially continuous conducting surface over the entire rotor body, which provides low resistance current paths and is more effective in shielding the rotor than the squirrel-cage type windings previously used.

The new damper winding has all the advantages of the previously proposed type of rotor damper. That is, in addition to shielding the rotor from the adverse effects of any non-synchronous fluxes which may occur, the damper also protects the field winding and excitation system of the generator from induced voltages and currents due to non-synchronous operation on system disturbances. The provision of an effective damper system in both the direct and quadrature axes also results in improved dynamic stability and tends to reduce hunting between generators on the same system. The damper also tends to reduce any pulsating shaft torques due to unbalanced loads or system disturbances. Thus, the new damper winding provides all of the advantages of previously proposed windings and, in addition, provides better electrical performance with regard to shielding the rotor from non-synchronous fluxes with a better and simpler mechanical structure.

What is claimed is:

1. A rotor for a dynamoelectric machine having a generally cylindrical rotor body with a plurality of longitudinal slots therein forming teeth between them, windings disposed in at least some of said slots, damper means comprising a plurality of longitudinal conductors disposed on the surface of the rotor, a conductor being placed on each of said teeth, each conductor being a bar of low resistance material having a longitudinal recess therein such that the bar is adapted to fit over a tooth and engage both sides thereof to hold the bar in place, each tooth having a shoulder thereof and each bar engaging under the shoulders on both sides of a tooth, and means for forcing adjacent bars into tight engagement and electrical contact with each other throughout their length.

2. A rotor as defined in claim 1 in which said bars are electrically connected together.

3. A rotor as defined in claim 1 in which adjacent bars are in contact throughout their length.

4. A rotor as defined in claim 2 in which adjacent bars are in contact throughout their length.

5. A rotor as defined in claim 1 wherein said forcing means includes wedge means between each pair of adjacent bars for forcing the bars into tight engagement with the teeth and effecting electrical contact between the bars throughout their length.

* * * * *